United States Patent
Gubbiotti

[15] 3,656,356
[45] Apr. 18, 1972

[54] CONTINUOUS GEAR-TYPE SPEED VARIATOR

[72] Inventor: Lino Gubbiotti, Perugia, Italy

[73] Assignee: Italvariatori Perugia S.r.l., Perugia, Italy

[22] Filed: Apr. 17, 1970

[21] Appl. No.: 29,603

[30] Foreign Application Priority Data

Apr. 24, 1969 Italy................................32,509 A/69
Apr. 3, 1970 Italy................................49,741 A/70

[52] U.S. Cl...................................74/63, 74/571, 74/29, 74/425
[51] Int. Cl...................................F16h 21/12, F16h 29/04
[58] Field of Search....................74/29, 30, 31, 63, 425, 571

[56] References Cited

UNITED STATES PATENTS

| | | | |
|---|---|---|---|
| 3,425,285 | 2/1969 | Kandell et al. | 74/29 |
| 1,876,129 | 9/1932 | Arnold | 74/571 |
| 3,490,299 | 1/1970 | Biniver | 74/63 |
| 1,472,848 | 11/1923 | Maag | 74/425 |
| 2,201,670 | 5/1940 | Kraus | 74/425 |

*Primary Examiner*—William F. O'Dea
*Assistant Examiner*—Wesley S. Ratliff, Jr.
*Attorney*—Waters, Roditi, Schwartz & Nissen

[57] ABSTRACT

A continuous gear-type speed variator characterized in comprising eccentric means for transforming the rotational movement of the input shaft into a reciprocational movement having a continuously variable amplitude, means participating of said reciprocating movement and carrying on each side of the driven shaft at least one endless screw, at least one helical gear ring rigid with the driven shaft, always engaged with the two endless screws, and means for rendering said endless screws alternately rigid with said reciprocating means so as to drive said gear ring like a rack in the stroke towards a direction of said reciprocating means, and capable of rotating, so as to passively follow the movement of said gear ring in the stroke towards the opposite direction of said reciprocating means.

16 Claims, 10 Drawing Figures

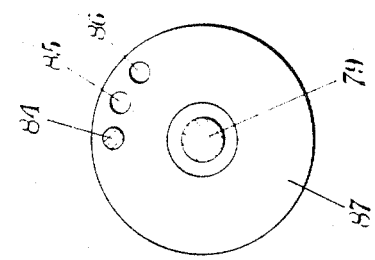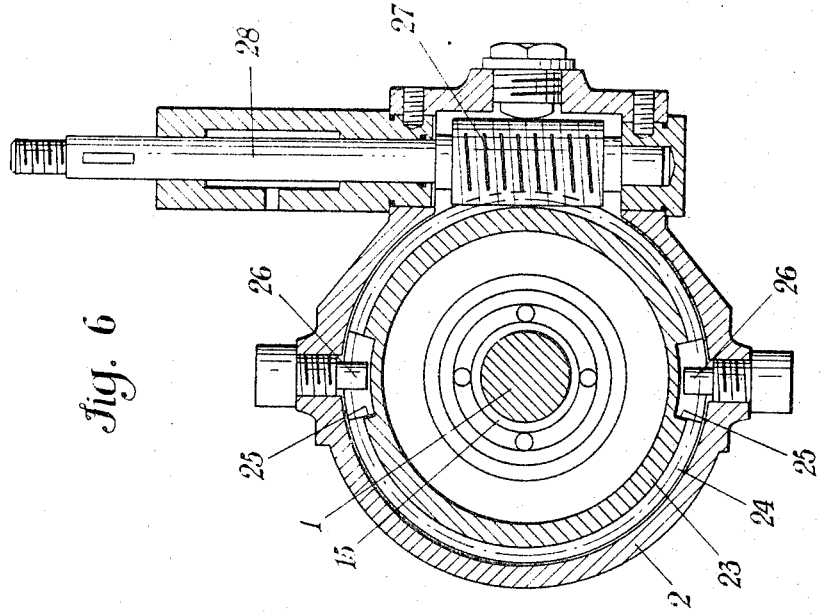

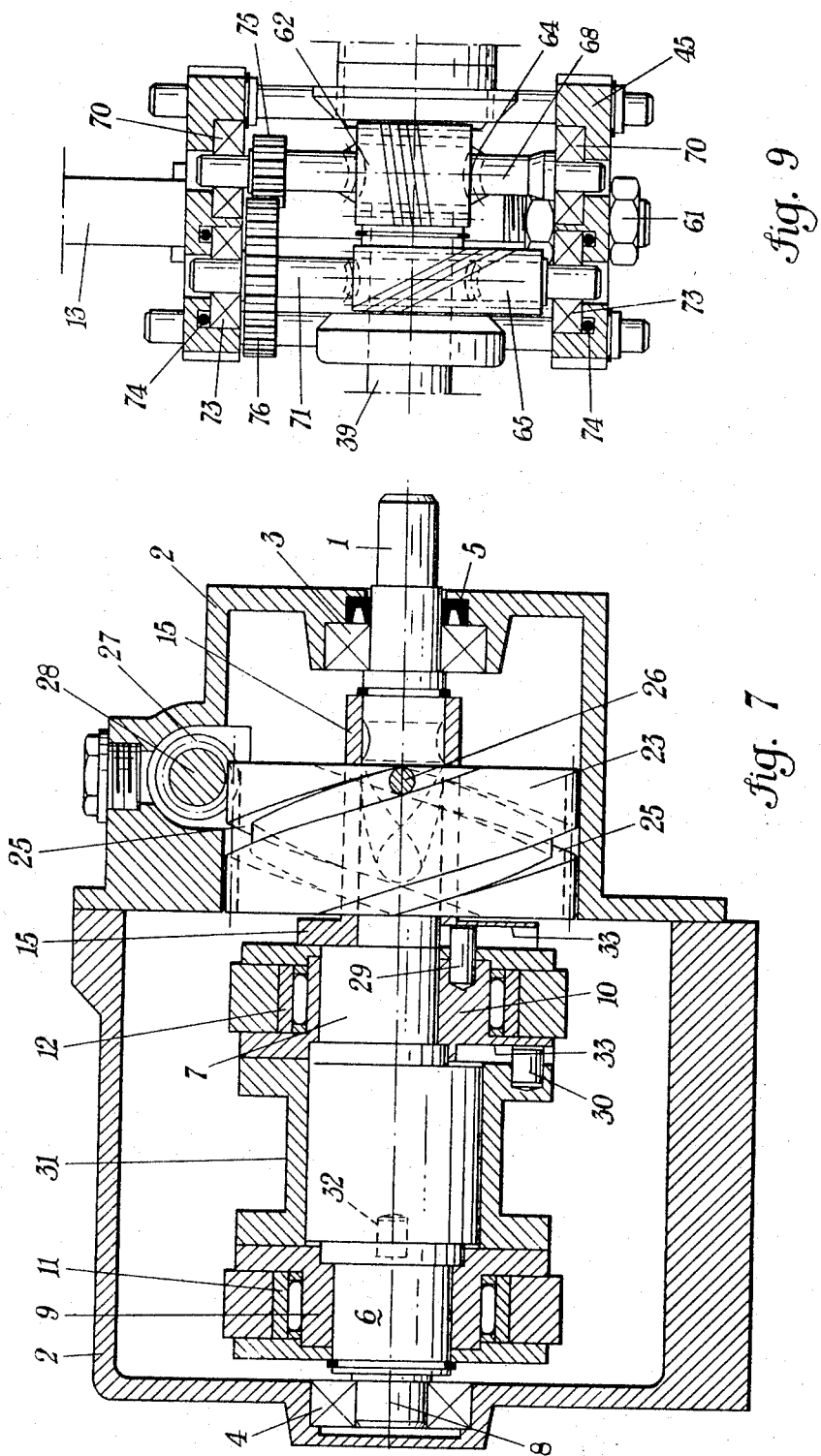

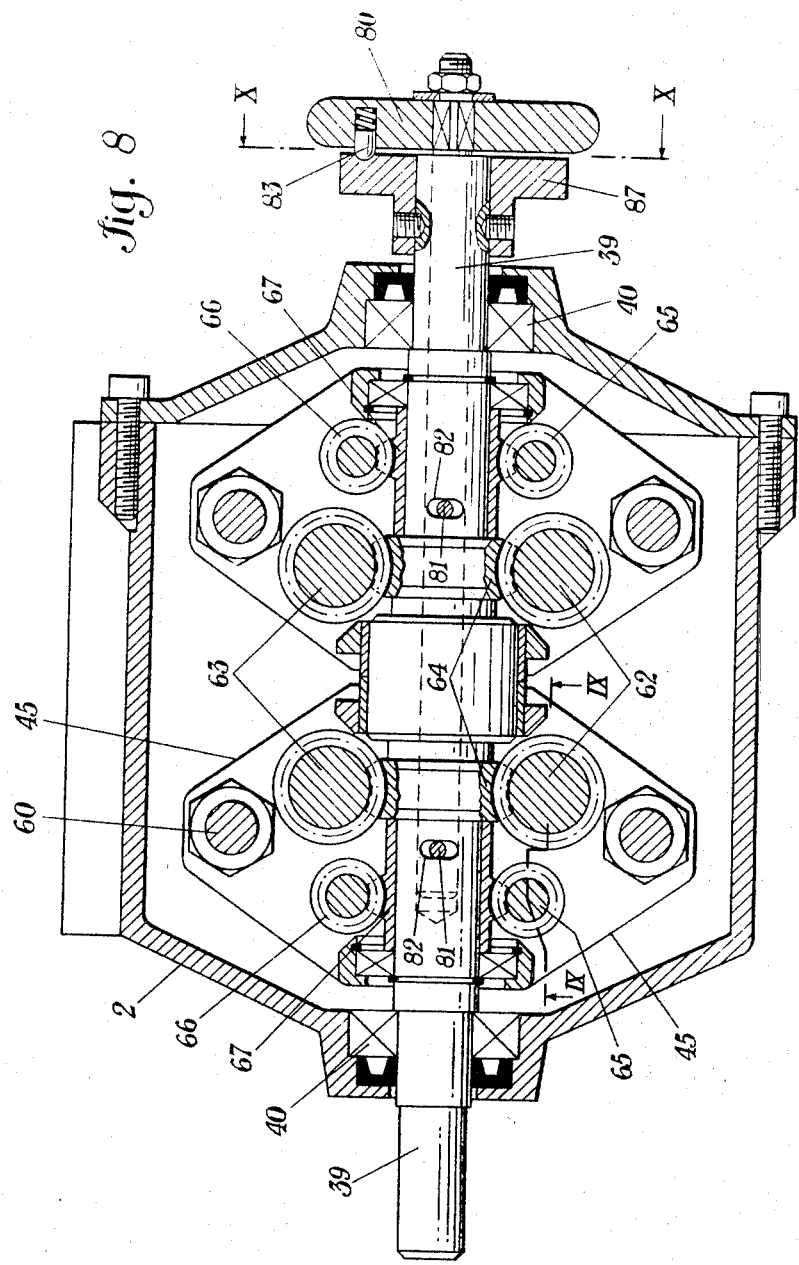

CONTINUOUS GEAR-TYPE SPEED VARIATOR

The present invention relates to a continuous gear-type, speed variator, suitable to be applied to any type of power drive for tool machines, vehicles, etc.

According to this invention, a continuous mechanical speed variator is provided, including eccentric means for transforming the rotational movement of the input shaft into a reciprocating movement having a continuously variable amplitude, means participating of said reciprocating motion and carrying on each side of the driven shaft at least one endless screw, at least a helical ring gear, rigid with the driven sheft, always engaged with the two endless screws, and means for rendering the latter alternately bodily connected to said reciprocating means, so as to drive said ring gear, racklike, in the stroke in one sense of said reciprocating means, and capable of rotating so as to passively follow the movement of said ring gear, in the stroke towards the opposite sense of said reciprocating means.

According to one embodiment of this invention, a gear-type continuously speed variator is provided having an entirely mechanical operation, including in combination, an input shaft connected to a prime mover, an output shaft parallel to the first cited shaft, to which a resistant torque is applied, at least one eccentric rigid with the input shaft, a connecting rod having one end mounted on said eccentric with the interposition of an eccentric ring, a pair of endless screws rigid with the connecting rod, rotatably mounted on parallel pins and engaged on diametrical points of a gear ring rigid with said output shaft, means for locking alternately the two endless screws with respect to their axis of rotation, in order to permit to said screws to act sequentially on said gear ring, like a rack, in order to drive the output shaft for rotation to an extent proportional to the stroke of said connecting rod, and means for varying continuously the stroke of the connecting rod in order to obtain a corresponding variation of the speed of the output shaft, from zero to a value greater than that of the speed of the input sheft.

Always according to the invention, said means for alternately locking the two endless screws, of a reversible type, consist of conical friction surfaces, provided at extreme opposite positions on both screws, between the rotation shaft of each screw and its associated support, and so mounted as to operate the locking of the screw when the latter moves through its active strokes, allowing, on the contrary, its free rotation in the reverse stroke. The sligh axial clearance allowing the aforesaid conical surfaces to operate as aforesaid is taken up by an elastic bushing, associated to a thrust bearing at the opposite end of said screws.

In a second embodiment of this invention, said "motive" endless screws are of irreversible type, and each of them is associated to a reversible endless screw parallel to the first cited screw, which is driven by a gear ring mounted on the output shaft, side by side with the gear ring which receives the useful torque from the irreversible screw. The latter, when it has effected its useful stroke, can freely revolute about its axis during the return stroke, due to a pair of gears which impart thereto the movement of said reversible screw. The two aforesaid screws are connected to one another by a pair of gears (bodily connected to the relative screws) the drive ratio of which must be such as to allow the driven screw to move through the same axial displacement as the driving screw.

Said passage from the rest position to the free axial revolution of each irreversible screw occurs due to the taking up of the clearance existing between the shafts of each irreversible screw and the shaft of the reversible screw associated thereto. The means for changing the drive ratio consist of an external control determining, even during the operation, the variation of the relative position of each eccentric ring with respect to the input shaft, so as to change the eccentricity acting on the connecting rods and therefore the stroke thereof.

Further according to the present invention, means are provided for determining at will the reversal of the direction of revolution of the output shaft. Said means consist of a bar received inside the output shaft, connected to an external control, acting on the gear rings engaged with the reversible screws, so as to determine on said rings a little rotation with respect to the output shaft, so as to reverse the axial clearance between the shaft of each reversible screw and the shaft of the irreversible screw associated thereto. In other words, the active thrust will be transmitted to that irreversible screw which was prior free, so as to reverse the operation stage, and obtaining thus the reversal of the direction of rotation of said output shaft.

This invention will be now described with reference to the attached drawings showing by way of non limitative example two preferred embodiments of the invention itself.

In the drawings:

FIG. 3 is a sectional view taken along the line III—III of FIG. 1;

FIG. 6 shows a sectional view taken along the line VI—VI of FIG. 4;

FIG. 7 shows a sectional view taken along the line VII—VII of FIG. 4;

FIG. 8 shows a sectional view taken along the line VIII—VIII of FIG. 4;

FIG. 9 shows a sectional view taken along the line IX—IX of FIG. 8;

FIG. 10 shows a sectional view taken along the line X—X of FIG. 8.

Figure 1:
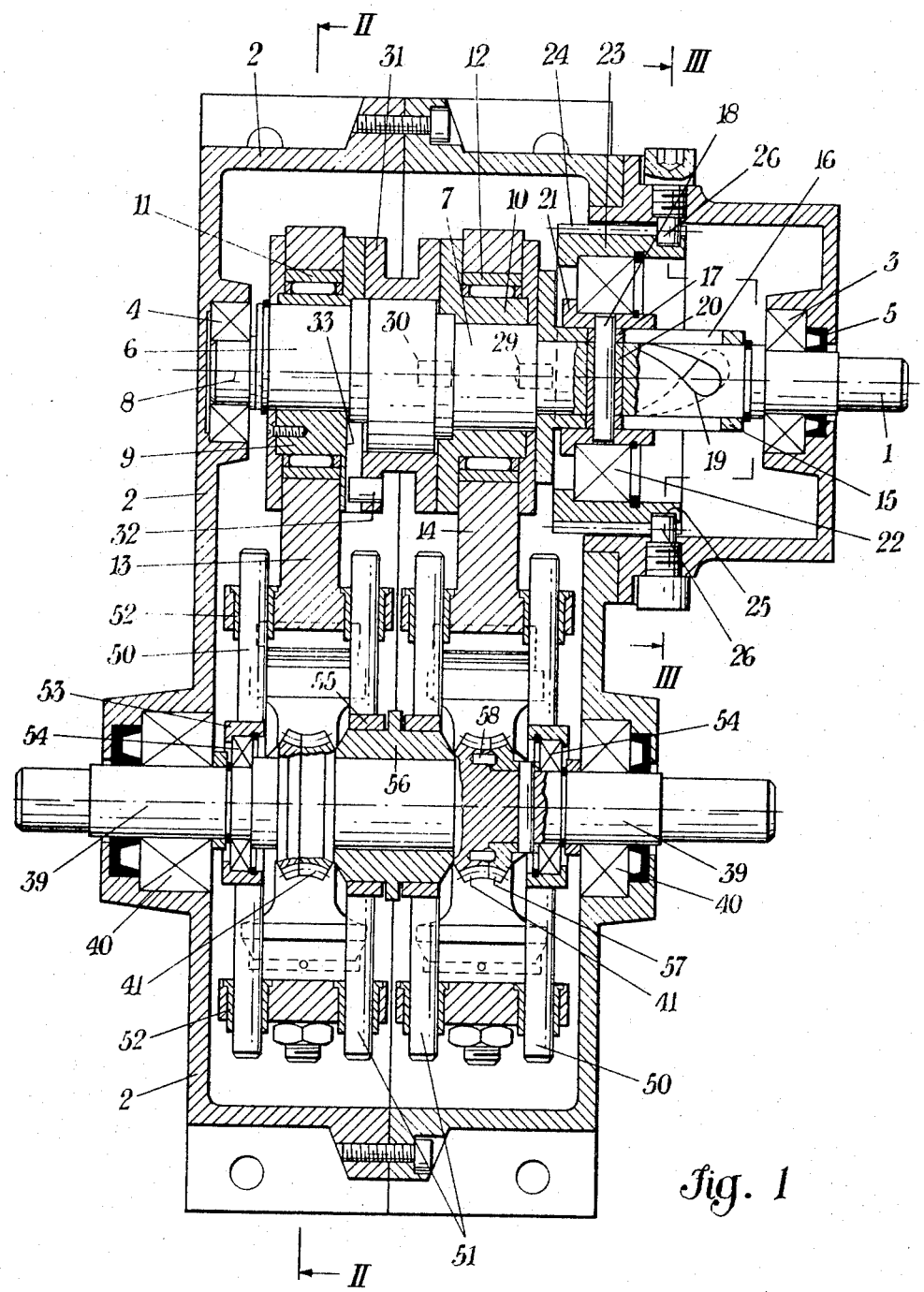
FIG. 1 shows a speed variator according to the present invention, in axial sectional view.
Figure 2:
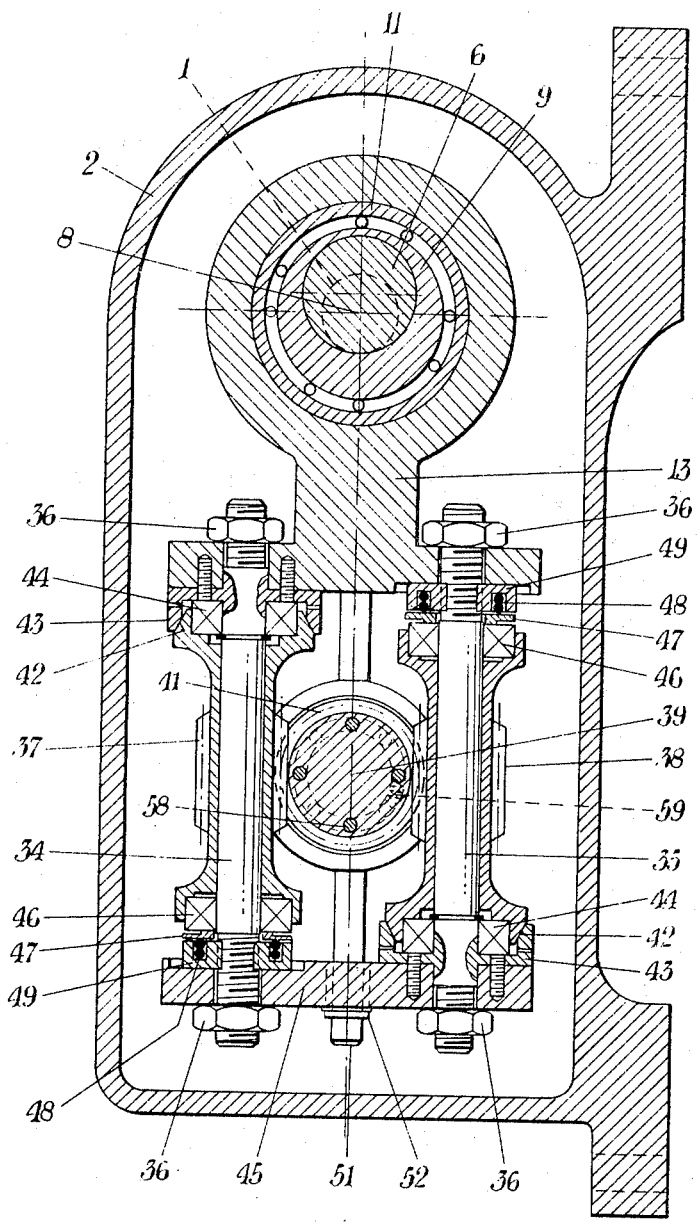
FIG. 2 is the sectional view, taken along the line II—II of FIG. 1.

With reference to FIGS. 1 to 3, the numeral reference 1 denotes the input shaft, connected to a prime mover, not shown. The input shaft 1 is journalled inside the casing 2 by means of the rolling bearing 3 and 4. Near to the fore end of the shaft 1 an oil seal ring 5 is provided. In the shaft 1 two circular contour eccentrics 6 and 7 are provided, staggered with respect to one another through 90° with respect to the axis of rotation 8 of the shaft 1. In FIG. 1, the maximum eccentricity of the eccentric 7 lies in the plane of the drawing, while the maximum eccentricity of the eccentric 7 will be found in a plane perpendicular to that of the drawing. On the eccentrics 6 and 7 are fit two eccentric rings 9 and 10, also with circular contour and having an eccentricity equal to that of the elements 6 and 7. On the contour of the rings 9 and 10 are fit the rolling bearings 11 and 12 and thereon are fit the rings of two connecting rods 13 and 14.

On the motive shaft 1 a sleeve 15 is mounted, provided with two opposite grooves 16 located along two generatrices, in said grooves being capable of gliding two rollers 17 carried by the transverse pin 18 passing through the shaft 1 in correspondence with the helical slot 19. Between the pin 18 and the slot 19 are interposed, inside the shaft 1, two other rollers 20. Said rollers 17 and 20 serve the function of reducing the friction and the wear between the moving parts. The two ends of the cross pin 18 are inserted into the collar 21 whereon is mounted a bearing 22 serving the function of ensuring the rotation of said collar with respect to the bushing 23 provided with the toothing 24.

The bushing 23 (see also FIG. 3) is provided with two helical grooves 25 into which are engaged the guide screws 26 rigid with the casing 2. With the toothing 24 of the bushing 23 is engaged on endless screw 27 carried by a shaft 28 operated by a hand-wheel or other control member, not shown in figure.

The sleeve 15 is connected through the pin 29 to the eccentric ring 10; the latter in turn is connected through the pin 30 to the spool 31 which in turn is connected to the eccentric ring 9 through the pin 32. One end of said pins 29, 30 and 32 can be glide in the respective radial grooves 33, one only of which has been shown in FIG. 1.

Each of the connecting rods 13 and 14 (see also FIG. 2) is provided with a pair of hubs 34 and 35 tightened by bolts 36, and on which are rotatably mounted the reversible thread endless screws 37 and 38, located laterally to the output shaft 39 mounted on the bearings 40 protected by the oil seal rings.

The endless screws 37 and 38 are simultaneously engaged with the toothed ring 41 mounted on the output shaft 39, and are shaped at one end with a conical surface 42 which skims the corresponding surface of the stationary support 43. Between said elements a bearing 44 is interposed. As shown in FIG. 2, the endless screw 37 is provided with the conical surface 42 at its upper end, while the endless screw 38 is provided with said conical surface 42 at its lower end, and the support 43 is fixed to the bracket 45 connecting the lower ends of the hubs 35. At their ends opposite to those of the conical surfaces 42, the endless screws 37 and 38 are provided with a bearing 46 resting on a thrust disc 47 which in turn contacts the elastic rings 48 received within the stationary support 49.

Each connecting rod is provided with a pair of guide stems 50 and 51, glidable in the bushings 52. The stems 50 are mounted on bushings 53 provided with a bearing 54 fit on the output shaft 39, while the rods 51 are provided with a ring 55 rotatable on the bearing 56.

The operation is as follows: in the position shown in FIG. 2, the eccentric 6 and the ring 9 have their eccentricities in opposition whereby the unit of the two elements 6 and 9 describes a circular path with its center on the axis 8 which is the axis of the input sheft 1. Accordingly, while the input shaft 1 revolutes at any speed the connecting rods 13 and 14 are stationary and also the output shaft 39 is stationary.

If the relative position of the eccentric 6 with respect to the ring 9 will be changed, the connecting rod will have a reciprocating movement, the stroke of which corresponds to the obtained eccentricity.

Considering FIG. 2, and assuming that the connecting rod 13 will start its downwards stroke, there will be a thrust of the support 43 on the conical surface 42 of the endless screw 37, which will be thus locked with respect to the hub 34. During the entire downwards stroke of the connecting rod 13, the endless screw 37 cannot revolute about the hub 34 acting thus, like a rack, on the gear ring 41 imparting a rotatory movement to the output shaft 39. Of course, said rotational movement of the output shaft 39 will have a speed which is proportional to the stroke of the connecting rod 13 and therefore to the eccentricity of the two elements 6 and 9. At the start of the downwards stroke of the connecting rod 13, the endless screw 38 is upwards pushed by the action of the gear ring 41 tending to move upwards the endless screw; said action is sufficient to overcome the elastic rest of the disc 47 and to cause the conical surface 42 of the screw 38 to move away from the relative support 43. Under these conditions, the endless screw 38 can freely revolute about its hub 35 through the entire downwards stroke of the connecting rod 13. At the end of the downwards stroke, the endless screw 38 will be locked, and it will act as a rack through the entire upwards stroke, while the endless screw 37 freely rotates about its hub 34. At this point, the initial position has been restored and the movement continues as aforesaid. Simultaneously, in the same way the connecting rod 14 will operate, effecting, however, its useful strokes with a 90° angular staggering in order to obtain a greater regularity of the movement.

As shown in FIGS. 1 and 2, the gear rings 41 are provided with a part 57 which, due to the pawls 58 and the springs 59, can describe little angular movements, serving thus the function of flexible coupling.

The change of ratio, as aforesaid, will be obtained by changing the eccentricity acting on the rods 13 and 14, i.e., by changing the relative position between the eccentrics 6 and 7 and the respective rings 9 and 10. By acting on the control shaft 28 the toothed bushing 23 will ba caused to revolute and the latter, due to the pins 26 will axially move driving the collar 21 which revolutes together with the input shaft 1. The displacement of the collar 21 causes the displacement of the pin 18 along the helical slot 19, and therefore a relative rotation between the shaft 1 and the sleeve 15. As the latter, as aforesaid, is connected to the eccentric rings 9 and 10 through the pins 29, 30 and 32, there is finally a change of the relative position between the eccentrics 6 and 7 and the relative rings 9 and 10, i.e., a change of the eccentricity. It is to be noted that this variation will be obtained in a continuous way and can be controlled both in stationary condition and in movement condition.

In FIGS. 4 to 10, where the already described parts are denoted by the same reference numerals, a second embodiment of this invention has been shown. In this case the bracket members 45 are connected by the connecting rods 13 and 14 by the uprights 60 tightened by the nuts 61. Each connecting rod is provided with a pair of irreversible thread endless screws 62 and 63, located side be side of the output shaft and constantly engaged with the ring 64 rigid with the shaft itself. Parallel to the irreversible screws 62 and 63, there are two reversible thread endless screw 65 and 66, constantly engaged with the ring 67 also rigid for rotation with the output shaft 39. The irreversible screws 62 and 63 are rigid with the shafts 68 and 69 journalled in the bearings 70, while the reversible screws 65 and 66 are rigid with the shafts 71 and 72 journalled in the bearings 73, resting on elastic rings 74.

The shafts 69 and 71 on the two endless screws 62 and 65 are connected to one another by a pair of toothed wheels 75 and 76 (see FIG. 9) always engaged with each other; likewise, the shafts 69 and 72 (see FIG. 4) located on the opposite part of the output shaft 39 are connected by an identical pair of gears 77 and 78.

Figure 4:
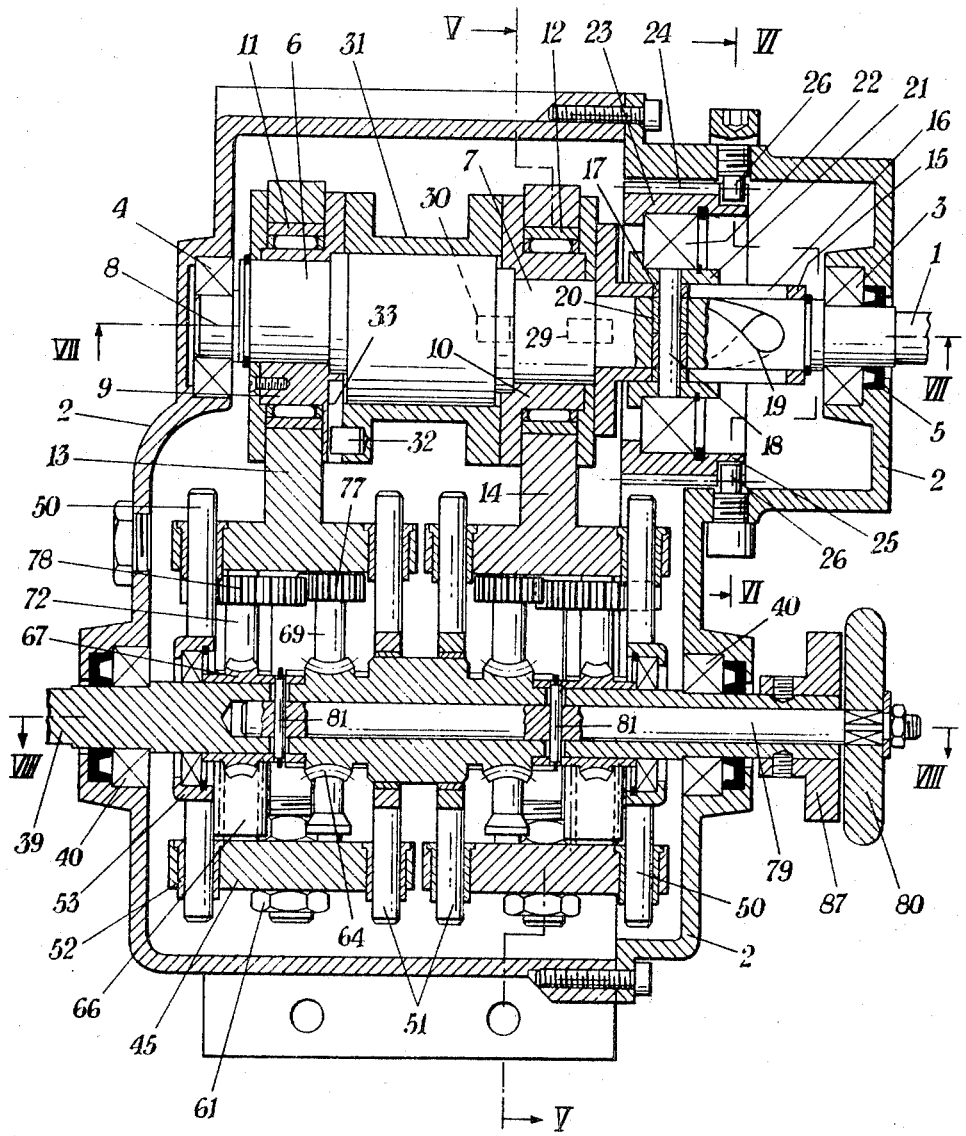
FIG. 4 is a view similar to FIG. 1, showing a second embodiment of this invention.
Figure 5:
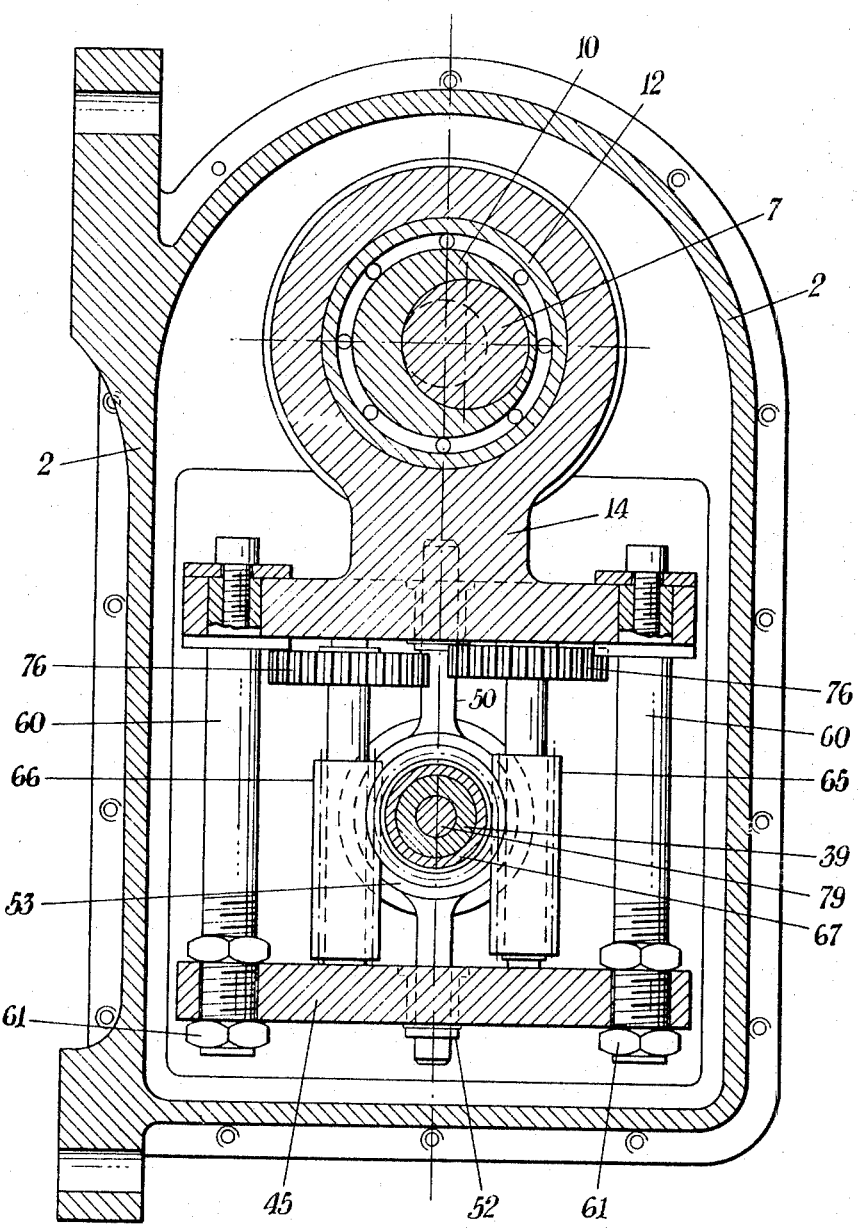
FIG. 5 is sectional view taken along the line V—V of FIG. 4.

The operation is as follows: assuming that the connecting rod 13, as shown in FIG. 9, starts its upwards stroke, the irreversible screw 62 operates like a rack on the gear ring 64, i.e., it moves upwards with no rotation about its axis, and imparts the rotatory movement to the output shaft 39. Also the reversible screw 65 moves upwards with no rotation as it is connected by its gear 76 to the toothed wheel 75 which is stationary, as the shaft 68 does not rotate. Simultaneously also the screw 66 and 63 move upwards but differently from the first cited screws, they will revolute freely about their axes as the screw 66 which is reversible, receives the movement from the gear ring 67 and transmits it through its entire upwards stroke to the irreversible screw 63 which is caused to rotate by the gears 78 and 77 (FIG. 4). The gears 78 and 77 can rotate as the reversible screw 66 rests on the bracket 45 while it presents a certain clearance at its other end.

At the end of the upwards stroke, the irreversible screw 63 will operate immediately like a rack during the downwards stroke, while the irreversible screw 62 rotates about its axis and so on.

Also in this case, the description concerning one connecting rod is meant to be extended to the other connecting rod, which operates with a 90° angle staggering in order to have a greater regularity of movement. In this connection it is to be noted that by way of example in the drawings have been shown two embodiments of two connecting rod variator, being however understood that their number can change depending upon the regularity of movement and of the performances which must be obtained from the variator itself.

Differently from the preceding embodiment, the variator shown in the FIGS. 4 to 10 is provided with a movement reversal control which can be operated as it is obvious, after the stop of the output shaft 39.

Said device includes a bar 79 inserted into the output shaft 39 rigid with a control handwheel 80 located outside the casing 2. This bar is provided with two pins 81 passing through the shaft 39 and entering into the slots 82 (FIG. 8) so as to be able to cause a slight rotation (in either direction) of the gear rings 67 associated to the reversible screws 65 and 66 with respect to the shaft 39.

This rotation is defined by a spring pin 83 (FIG. 8) carried by the hand wheel 80 which enters into three holes 84, 85 and 86 provided in the disc 87 (FIG. 10) rigid with the shaft 39. To the central position 85 corresponds the "idle position," i.e., the shaft 39 is stationary, independently from the rate of the angular speed of the input shaft 1 and from the rate of the eccentricity.

To the two remaining positions 84 and 86 correspond the two directions of rotation of the output shaft 39. Possible dynamic balancing masses can be mounted on the sleeve shown at 31.

The present invention has been described in one preferred embodiment, being however understood that executive changes might be practically adopted without departing from the scope of the present industrial privilege.

Having thus described the present invention, what is claimed is:

1. A continuous gear type speed variator adapted for vehicles, tool machines and like having a prime motor and an input and output shaft arranged parallel to one another, comprising in combination a first eccentric mounted on said input shaft, a second eccentric ring mounted on said first eccentric, a connecting rod having its one end rotatably arranged around said eccentric end, two bars arranged parallel to one another and fastened at their upper end to the other end of said connecting rod, a first and second reversible worm screw rotatably arranged each on one of said bars, the first worm screw having a conical surface at its upper end and the second worm screw having a conical outer surface at its lower end, a first and second stationary support having a conically shaped inner surface arranged on the upper respectively lower end of said bars to frictionally engage said conical outer surfaces, a bracket fastened to the lower ends of said bars, a toothed wheel fastened on said output shaft and arranged between said first and second worm screws to mesh with them at its diametrically opposed points and means for changing the position of said eccentric ring with respect to said eccentric on said input shaft to control the stroke of said connecting rods in order to obtain a variation of the rotation speed of said output shaft.

2. A variator as claimed in claim 1, wherein, between each friction conical surface and the corresponding stationary support, an elastic bushing is arranged to provide a light axial clearance, and a thrust bearing is mounted on the opposite end of said worm screws.

3. A variator as claimed in claim 1, wherein said eccentric rings are connected to a central sleeve interposed by means of pins located parallel to the axis of rotation and glidable within radial slots provided in said rings.

4. A variator as claimed in claim 1 wherein said variation means for the eccentricity include an external control shaft destined to cause the axial gliding of a toothed bushing concentrical with the input shaft, and connected to a collar coaxial with the input shaft, rigid therewith for rotation, and glidable on a sleeve rigid with the said eccentrical rings.

5. A variator as claimed in claim 1 wherein the output shaft is provided with means to cause, at will, the reversal of the direction of said shaft.

6. A variator as claimed in claim 1, comprising means for alternately locking the two reversible screws, said means having friction conical surfaces, provided in extreme opposite positions on the two screws, between the rotational shaft of each screw and its associated support, said locking means being arranged to operate the locking of each screw when the latter moves along its active stroke, and to allow the free rotation thereof in the reverse stroke.

7. A variator as claimed in claim 6, including between each friction conical surface and the corresponding stationary support a small axial clearance provided by an elastic bushing which is associated with a thrust bearing mounted on the opposite end of said screws.

8. A variator as claimed in claim 7, wherein the possible axial clearances due to wear are taken up by a pair of elastic rests, whereon are mounted the bearings supporting at their ends the shaft of each irreversible screw.

9. A variator as claimed in claim 3 wherein the variation of the angular position of said sleeve with respect to the input shaft is obtained by a cross pin passing through a helical slot provided in the input shaft and having its ends guided along two slots diametrically opposite, provided in said sleeve.

10. A variator as claimed in claim 9 wherein between said cross pin and the respective guide slots provided in the shaft and in the sleeve are interposed gliding rollers serving the purpose of reducing the friction and the wear of the moving parts.

11. A variator as claimed in claim 10, wherein the rotation of said toothed bushing due to action of the control shaft will be converted into an axial gliding of the bushing and of the collar associated thereto by a pair of pins, rigid with the casing which enter into a corresponding pair of helical grooves provided on the outer face of said toothed bushing.

12. A variator as claimed in claim 5 wherein said means for reversal of movement consist of a rod inserted into the output shaft, projecting from one end of the latter, and connected to an operation hand-wheel and rendered rigid to said shaft by a pair of cross wise located pins, the ends of which pass through a pair of holes provided in the shaft itself.

13. A variator as claimed in claim 12 wherein said pins act on the gear rings associated to the reversible screws, in order to cause in said rings a rotation relative with respect to the output shaft, such as to displace the contact point between the toothing of the rings and the respective reversible screws, in order to obtain the conditions of clockwise, idle, or counter-clockwise movement.

14. A variator as claimed in claim 13 wherein the three aforesaid positions of the pins and of the control shaft associated thereto are defined by a spring pin, carried by the control hand-wheel which inserts in three different seats carried by a disc rigid with the output shaft.

15. A continuous gear type speed variator adapted for vehicles, tool machines and like having a prime motor and an input and output shaft arranged parallely to one another, comprising in combination a first eccentric mounted on said input shaft, a second eccentric ring mounted on said first eccentric, a connecting rod having its one end rotatably arranged around said eccentric end, two uprights arranged parallely to one another and fastened to said connecting bar, a first toothed wheel mounted on said output shaft, two first shafts arranged parallely to one another at diametrally opposed points of said first toothed wheel and supported at their upper ends in said connecting rod, two first irreversible worm screws fastened each on one of said first shafts to mesh with said first toothed wheel, a second toothed wheel mounted on said output shaft, two second shafts arranged parallely to one another at diametrically opposed points of said second toothed wheel, two reversible worm screws mounted each on one of said second shafts to mesh with said second wheel, two first gear wheels mounted each on of said first shafts at the upper part thereof, two second gear wheels mounted each on one of said second shafts at upper part thereof to pair-wise mesh with said first gear wheels, a bracket member supporting the lower ends of said uprights, first and second shafts and nuts fastening said upright to said connecting rod and bracket member, whereby each irreversible screw when it has effected its useful stroke, can freely rotate about its axis during the return stroke by means of said second gear wheels transmitting thereto the movement of the associated reversible screw.

16. A speed variator as claimed in claim 15, wherein elastic bearings are provided to support the ends of said second shafts on said connecting rod and bracket member to compensate for axial clearances between said first and second shafts due to the contact of said first and second gear wheels and due to wear.

* * * * *